US010606854B2

(12) United States Patent
Kenshalo, III

(10) Patent No.: US 10,606,854 B2
(45) Date of Patent: Mar. 31, 2020

(54) INTELLIGENT CASCADING LINKAGE MACHINE FOR FUZZY MATCHING IN COMPLEX COMPUTING NETWORKS

(71) Applicant: BLACK KNIGHT IP HOLDING COMPANY, LLC, Jacksonville, FL (US)

(72) Inventor: Daniel R. Kenshalo, III, Newport Beach, FL (US)

(73) Assignee: Black Knight IP Holding Company, LLC, Jacksonville, FL (US)

( * ) Notice: Subject to any disclaimer, the term of this patent is extended or adjusted under 35 U.S.C. 154(b) by 691 days.

(21) Appl. No.: 15/189,794

(22) Filed: Jun. 22, 2016

(65) Prior Publication Data

US 2017/0371934 A1 Dec. 28, 2017

(51) Int. Cl.
*G06F 16/2458* (2019.01)
*G06N 20/00* (2019.01)
*G06N 5/00* (2006.01)
*G06N 20/20* (2019.01)
*G06N 20/10* (2019.01)

(52) U.S. Cl.
CPC ......... *G06F 16/2468* (2019.01); *G06N 5/003* (2013.01); *G06N 20/00* (2019.01); *G06N 20/20* (2019.01); *G06N 20/10* (2019.01)

(58) Field of Classification Search
CPC .... G06F 16/2468; G06N 20/20; G06N 20/00; G06N 5/003; G06N 20/10
USPC ....................................................... 707/780
See application file for complete search history.

(56) References Cited

U.S. PATENT DOCUMENTS

| | | | | |
|---|---|---|---|---|
| 9,552,393 | B2* | 1/2017 | Botros | G06F 17/30522 |
| 2008/0189279 | A1* | 8/2008 | Mayer | G06F 17/30542 |
| 2011/0289026 | A1* | 11/2011 | Kannan | G06F 17/30997 |
| | | | | 706/12 |
| 2013/0185306 | A1* | 7/2013 | Botros | G06F 17/30522 |
| | | | | 707/748 |
| 2014/0344274 | A1* | 11/2014 | Kido | G06F 19/324 |
| | | | | 707/737 |
| 2015/0066951 | A1* | 3/2015 | Natarajan | G06F 17/30303 |
| | | | | 707/748 |
| 2015/0254308 | A1* | 9/2015 | Scott | G06F 17/30345 |
| | | | | 707/780 |
| 2015/0269486 | A1* | 9/2015 | Paxton | G06F 17/30424 |
| | | | | 706/56 |
| 2016/0253679 | A1* | 9/2016 | Venkatraman | G06Q 30/0185 |
| | | | | 705/310 |
| 2017/0286542 | A1* | 10/2017 | Courtright | G06F 17/30864 |
| 2018/0053096 | A1* | 2/2018 | Farrell | G06F 17/30958 |
| 2018/0113928 | A1* | 4/2018 | Oberhofer | G06F 17/30303 |

* cited by examiner

*Primary Examiner* — Alica M Willoughby
*Assistant Examiner* — Arthur Ganger
(74) *Attorney, Agent, or Firm* — Baker & McKenzie LLP

(57) ABSTRACT

This disclosure is directed to an intelligent cascading linkage machine for transforming input signals into comparable signals, and cascading through matching operations, including but not limited to a fuzzy matching comparison technique, to link transformed input signals (comparable signals) to those stored signals in a database which match it. The fuzzy matching technique may use a random forest processing technique and/or a logistic regression technique. Also, the machine is able to calibrate its matching technique, based on the linking of a comparable or input signal to a stored signal in a database, in order to calculate an accuracy indicator.

18 Claims, 8 Drawing Sheets

| INPUT ADDRESS | MATCHED ADDRESS | MATCHING SCORE | COMMENT |
|---|---|---|---|
| 10885 CRAVEN RDG WAY | 10885 CRAVEN RIDGE WAY | 0.909 | GOOD MATCH |
| 10885 CRAVEN RIDGE WA | 10885 CRAVEN RIDGE WAY | 0.955 | GOOD MATCH |
| 101 N POINSETTIA PLAC | 101 N POINSETTIA PL | 0.905 | GOOD MATCH |
| 101 N POINSETTIA PLAC | 101 S POINSETTIA PL | 0.857 | FALSE POSITIVE |
| 401 EL CAMINITO RD | 401 C EL CAMINITO RD | 0.900 | MULTIPLE MATCH |
| 401 EL CAMINITO RD | 401 C EL CAMINIO RD | 0.900 | MULTIPLE MATCH |
| 7711 JUAN WAY | NULL | 0.0 | NO MATCH |

FIG. 4

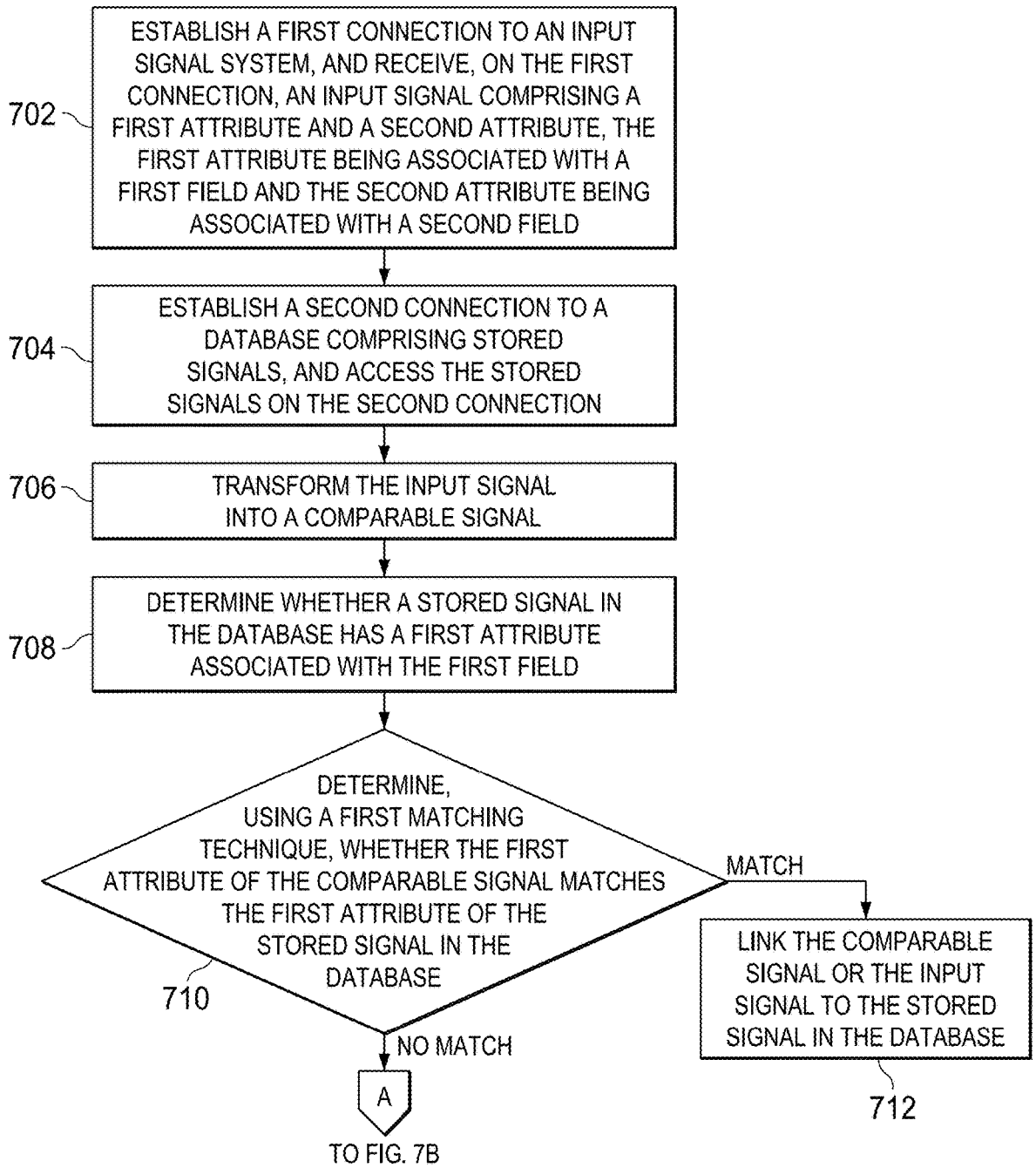

INTELLIGENT CASCADING LINKAGE MACHINE FOR FUZZY MATCHING IN COMPLEX COMPUTING NETWORKS

TECHNICAL FIELD

This disclosure is directed to cascading linkage machines in complex computing networks, suitably assigned to, in order of preference:
1) USPC 706/001 or 706/900 (Art Unit 2129) both corresponding to CPC G06N 7/04.
2) USPC 707/705 or 707/821 (Art Unit 2161) corresponding to CPC G06F 17/30864 and G06F 17/30067 respectively.
3) USPC 712/001 (Art Unit 2183) corresponding to CPC G06F 9/3867.
4) USPC 709/246 or 709/238 (Art Unit 2447) corresponding to CPC H04L 29/00.

BACKGROUND

There is a need for matching and linking signals in a complex computing network.

BRIEF SUMMARY

In some embodiments, an intelligent cascading linkage machine is provided for transforming input signals into comparable signals. But for the transforming and the linking performed by the cascading linkage machine, at least some of the input signals are not comparable and linkable to the stored signals comprised in the database. The intelligent cascading linkage machine comprises a communication interface for establishing a first connection to an input signal system and receiving, on the first connection, an input signal. The input signal comprises a first attribute and a second attribute, the first attribute being associated with a first field and the second attribute being associated with a second field. The cascading linkage machine establishes a second connection to a database comprising stored signals and accesses the stored signals on the second connection. The cascading linkage machine comprises a chipset interfaced with a processor. The chipset has hardware for supporting the first connection to the input signal system and the second connection to the database. The cascading linkage machine comprises a power provisioning interface for facilitating powering of the chipset and the processor. The cascading linkage machine also comprises a processor, configured for transforming the input signal into a comparable signal, wherein the transforming comprises at least one of modifying the first attribute or the second attribute, deleting at least a portion of the first attribute or the second attribute, adding a new portion to the first attribute or the second attribute, and adding a third attribute to the signal, the third attribute being associated with a third field. The processor determines whether a stored signal in the database has a first attribute associated with the first field and accesses a first matching operation. The first matching operation determines, using a first matching technique, whether the first attribute of the comparable signal matches the first attribute of the stored signal in the database. In response to determining the first attribute of the comparable signal matches the first attribute of the stored signal in the database, the processor links the comparable signal or the input signal to the stored signal in the database. In response to determining the first attribute of the comparable signal does not match the first attribute of the stored signal in the database, the processor cascades to a second matching operation. The second matching operation determines whether the stored signal in the database has a second attribute associated with the second field. The process determines, using the first matching technique or a second matching technique, whether the second attribute of the comparable signal matches the second attribute of the stored signal in the database. In response to determining the second attribute of the comparable signal matches the second attribute of the stored signal in the database, the processor links the comparable signal or the input signal to the stored signal in the database. In response to determining the second attribute of the comparable signal does not match the second attribute of the stored signal in the database, the processor cascades to a fuzzy match operation. The fuzzy match operation determines, using a fuzzy matching comparison technique, whether the comparable signal matches the stored signal in the database. In response to determining, using the fuzzy matching comparison technique, the comparable signal matches the stored signal in the database, the processor links the comparable signal or the input signal to the stored signal in the database.

In some embodiments, the processor of the intelligent cascading linkage machine is further configured for calibrating, based on the linking of the comparable signal or the input signal to the stored signal in the database, the first matching technique, the second matching technique, the fuzzy matching comparison technique, or a technique for calculating a strength indicator indicating a strength of the linking of the comparable signal or the input signal to the stored signal in the database. In some embodiments, the processor of the intelligent cascading linkage machine calibrating a technique for calculating the strength indicator is further configured for improving the technique for calculating the strength indicator after every linking of the comparable signal or the input signal to the stored signal in the database.

In some embodiments, the processor of the intelligent cascading linkage machine is further configured for determining, using an eliminatory matching technique, a second stored signal in the database incorrectly linked to the comparable signal or the input signal and eliminating the linking between the second stored signal in the database and the comparable signal or the input signal.

In some embodiments, the processor of the intelligent cascading linkage machine of claim is further configured for providing a link table. The link table comprises the comparable signal or the input signal, the stored signal in the database linked to the comparable signal or the input signal, and a strength indicator indicating a strength of the linking of the comparable signal or the input signal to the stored signal in the database.

In some embodiments, when linking the comparable signal or the input signal to the stored signal in the database, the processor of the intelligent cascading linkage machine is further configured for establishing a connection to the signal database or any other database and storing a link created by the linking in the signal database or the other database.

In some embodiments, the intelligent cascading linkage machine further provides a field or a matching technique that causes the linking of the comparable signal or the input signal to the stored signal in the database. In some embodiments, the intelligent cascading linkage machine transforming the input signal into the comparable signal may include transforming a stored signal into a second comparable signal.

In some embodiments, the processor of the intelligent cascading linkage machine is further configured for calibrating, based on the linking of the comparable signal or the input signal to the stored signal in the database, a technique for calculating the strength indicator.

In some embodiments, the link table of the intelligent cascading linkage machine further comprises a second stored signal in the database linked to the comparable signal or the input signal. In some embodiments, the link table of the intelligent cascading linkage machine further comprises comparable second signal or input second signal not linked to a stored signal in the database. In some embodiments, the link table of the intelligent cascading linkage further comprises a matching score for determining whether there is or is not a match.

In some embodiments, the processor of the intelligent cascading linkage machine is further configured for determining a strength indicator indicating a strength of the linking of the comparable signal or the input signal to the stored signal in the database.

In some embodiments, the fuzzy matching comparison of the intelligent cascading linkage machine further comprises use of at least one of a Jaro-Winkler distance operation, a Levenshtein distance operation, a Soundex operation, an Edit distance operation, a Support Vector Machine, and a Machine Learning Library.

In some embodiments, the fuzzy matching comparison technique of the intelligent cascading linkage machine further comprises a random forest processing technique. In some embodiments, the random forest processing technique of the fuzzy matching comparison technique further comprises calculating a list of computational scores to be used by one or more matching operations within the fuzzy matching comparison, calculating two final computational scores, and comparing one or more final computational scores to one or more thresholds. The two final computational scores indicate the number of one or more match operations that transformed an input score into an indication of whether there is a match and whether there is no match. In some embodiments, the one or more thresholds are adjustable.

In some embodiments, the fuzzy matching comparison technique of the intelligent cascading linkage machine further comprises a logistic regression technique. In some embodiments, the logistic regression technique of the fuzzy matching comparison technique further comprises calculating a probability and a weighted sum of match scores. The probability and the weighted sum of match scores are compared to a threshold. In some embodiments, the threshold is adjustable.

BRIEF DESCRIPTION OF THE DRAWINGS

FIG. 4 is a table of example linkages for intelligent machine cascading linkage, in accordance with some embodiments of the invention;

FIGS. 7A and 7B are block diagrams of a method for intelligent machine cascading linkage in a complex computing network, in accordance with some embodiments of the invention.

Figure 1:
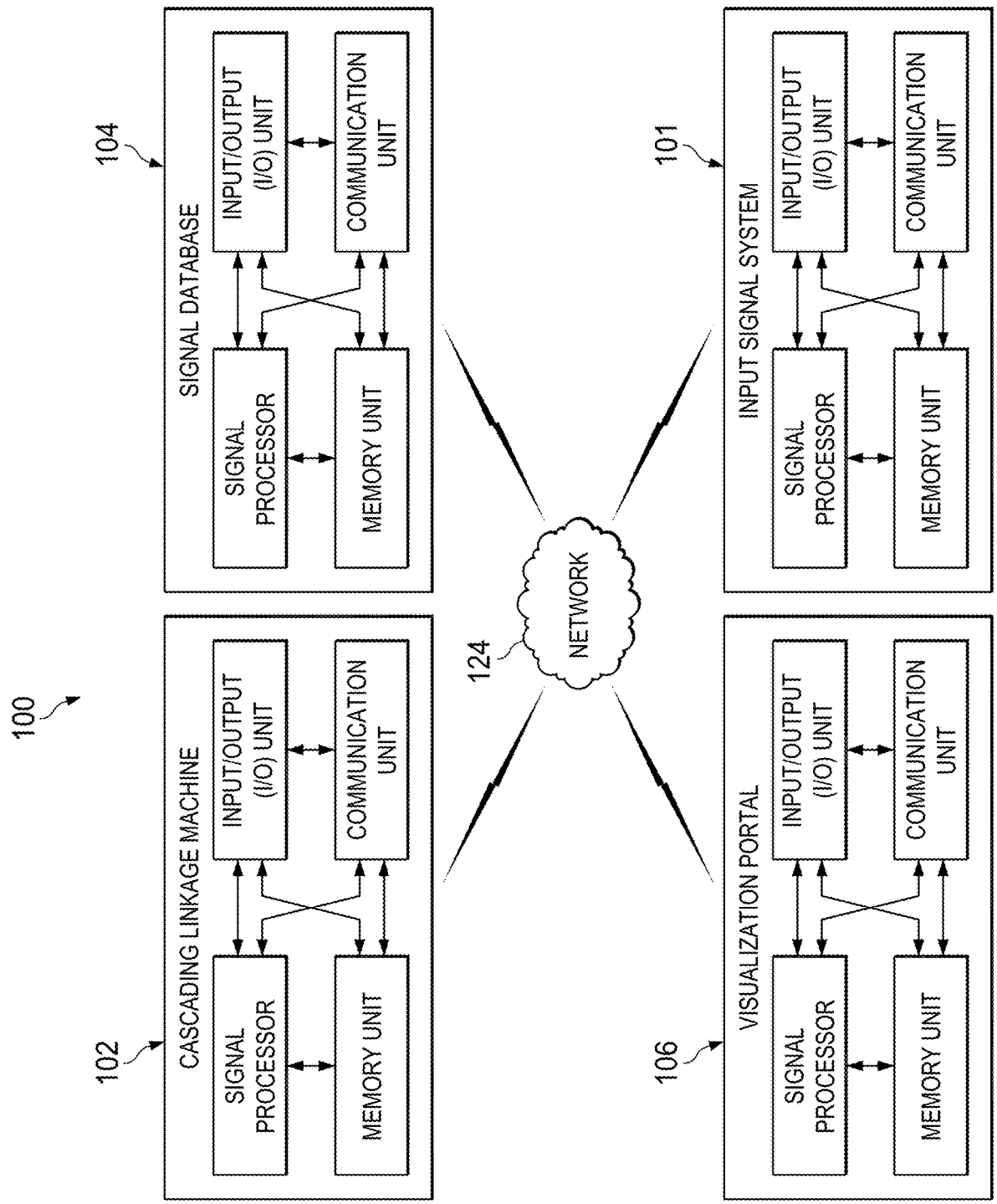
FIG. 1 is a block diagram of a complex computing network for intelligent machine cascading linkage, in accordance with some embodiments of the invention.

All of these drawings are illustrations of certain embodiments. The scope of the claims is not limited to the specific embodiments illustrated in the drawings and described herein.

DETAILED DESCRIPTION OF THE EMBODIMENTS

FIG. 1 is a block diagram of a complex computing network environment 100 for intelligent machine cascading linkage. The network environment 100 comprises a network 124 (e.g., a wired or wireless network) for enabling communication between the various systems presented in FIG. 1. The network environment 100 further comprises an input signal system 101, a cascading linkage machine 102, a signal database 104, and a visualization portal 106. Any of the input signal system 101, the cascading linkage machine 102, the signal database 104, or the visualization portal 106 may be compatible with a non-mobile computing device, such as a desktop computer or a mobile computing device such as a mobile phone, laptop, tablet, watch, and/or the like. In some embodiments, the visualization portal 106 may be comprised in an output signal system. Alternatively, the visualization portal 106 may be in communication with the output signal system.

The input signal system 101 receives input signals and may communicate with the signal database 104 to access stored signals. The cascading linkage machine 102 cascades through matching operations to find matches between two signals (e.g., input signals, comparable signals, stored signals, and/or the like) and create linkages between those two signals. The cascading linkage machine 102 also transforms signals into comparable signals when necessary. The signal database 104 holds signals (e.g., input signals, comparable signals, stored signals, and/or the like), temporarily or long-term, for use in signal comparisons. The visualization portal 106 performs tasks such as outputting data to the user (e.g., through a device such as a computer screen, mobile phone, audio, text document, and/or the like).

In some embodiments, various application signal systems may additionally or alternatively be directly connected to the network 124 and/or any of the other systems such as the input signal system 101, the cascading linkage machine 102, the signal database 104, or the visualization portal 106. In some embodiments, each of the various application signal systems may comprise signals or data of a certain type. In some embodiments, each of the various application signal systems are disparate, associated with different entities, and there is no overlap of signals between the application signal systems (and no connections, direct and/or indirect) between the application signal systems. In some embodiments, there may be overlap of signals between the application signal systems and there may be connections, direct and/or indirect, between the application signal systems. In some embodiments, the signals from each of the various application signal systems may be comprised in the signal database 104 such that it may not be necessary to access an individual application signal system when the signal database 104 receives a request for a signal from the cascading linkage machine 102. In some embodiments, the signals at an individual application signal system may be accessed by the signal database 104 to obtain the most recent version of the signals. In some embodiments, one or more application signal systems may be represented by the system database 104.

Each of the input signal system 101, the cascading linkage machine 102, the signal database 104, and the visualization portal 106, may comprise a signal processor, a memory unit, an input/output (I/O) unit, and a communication unit. The signal processor, the memory unit, the I/O unit, and the communication unit are described in further detail in FIG. 2. As explained in FIG. 2, the memory unit, the I/O unit, the communication unit, and the signal processor may interact via a chipset such as an intelligent chipset. In some embodiments, the functionality of one or more of the input signal system 101, the cascading linkage machine 102, the signal database 104, and the visualization portal 106 may be combined into a single system.

In some embodiments, the term "signal" may refer to "data" or "information." In some embodiments, the terms "signal," "data," and "information" may be used interchangeably. In addition, the terms "technique" and "operation" may be used interchangeable, in some embodiments. Any reference to signals may also include references to the contents of the signals, e.g., signal attributes. Any signals described herein may be electronic or electromagnetic signals. Any signals described herein may be input signals, comparable signals, or stored signals. Additionally, any signals described herein may be either be transitory or non-transitory signals. Additionally, any signals described herein may be analog signals, digital signals, and/or mixed analog and digital signals. The terms "system," "apparatus," "server," "agent," "transducer," "device," "unit," "sub-unit," "element," "machine," "transformer," and/or the like, may be used interchangeably in some embodiments. In some embodiments, a method is provided for performing the various steps performed by any system described herein. In some embodiments, a non-transitory computer-readable medium comprising code is provided for causing a system to perform the various methods described herein. In some embodiments, a system may comprise a housing that includes various units, sub-units, elements, and/or the like, such as those illustrated in FIG. 2. In some embodiments, a chipset may be disposed in the housing and may be interfaced with a processor such as a signal processor. The chipset may have hardware (e.g., electronic components in an electronic circuit) for supporting various connections within the system, or any other connection from the system to external systems or devices.

Figure 2:
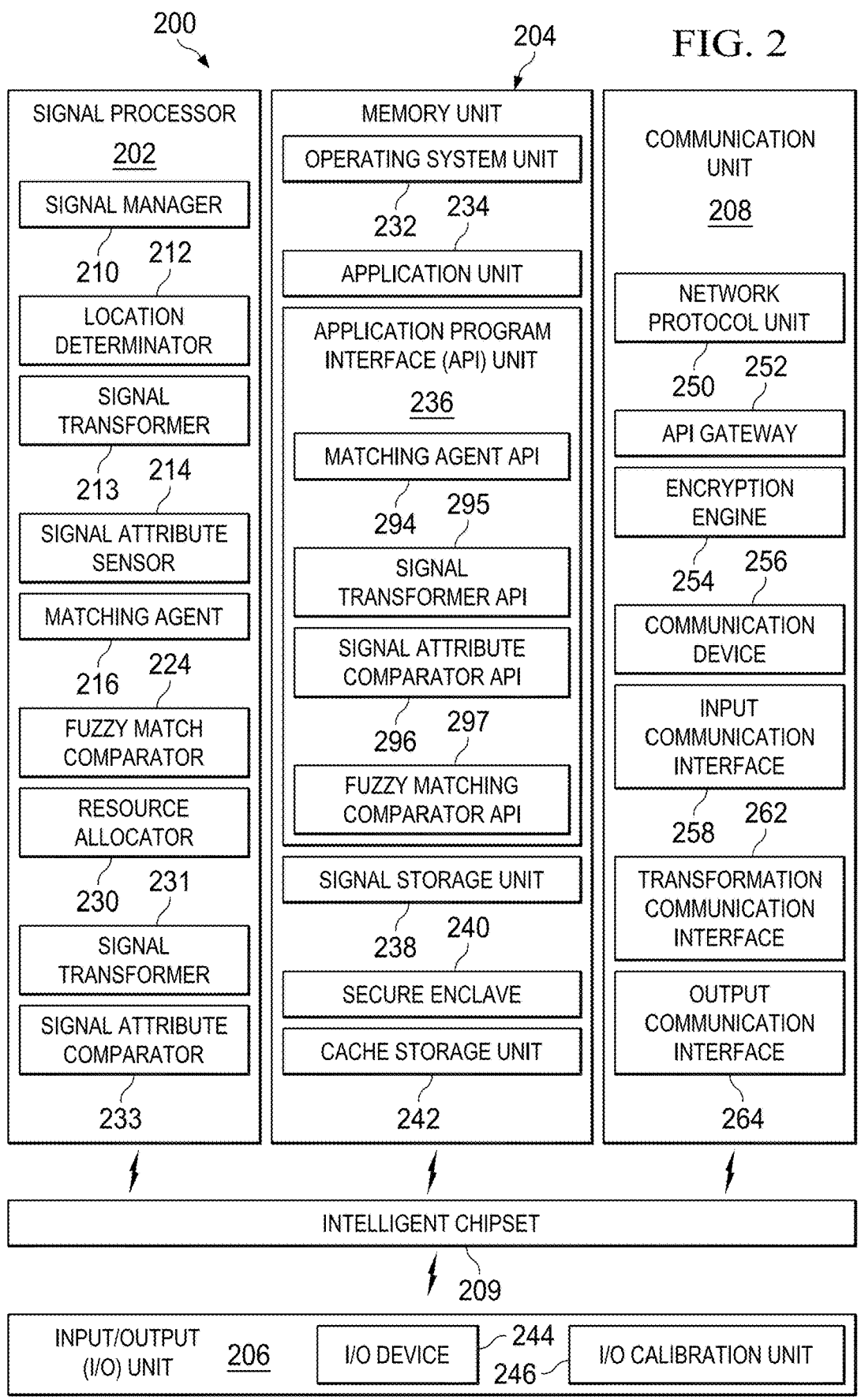
FIG. 2 is a block diagram of a complex computing environment for intelligent machine cascading linkage, in accordance with some embodiments of the invention.

FIG. 2 illustrates an exemplary complex computing environment 200 for intelligent machine cascading linkage. For example, the computing environment 200 may be included in and/or utilized by the input signal system, the cascading linkage machine, the signal database, the visualization portal, any of the application signal systems, and/or any other system described herein. The computing environment 200 and/or any of its units and/or sub-units described herein may include general hardware, specifically-purposed hardware, and/or specially-purposed software.

The computing environment 200 may include, among other units, a signal processor 202, a memory unit 204, an input/output (I/O) unit 206, and/or a communication unit 208. As described herein, each of the signal processor 202, the memory unit 204, the I/O unit 206, and/or the communication unit 208 may include and/or refer to a plurality of respective units, sub-units, and/or elements. The various units, sub-units, and/or elements may be implemented entirely in hardware, entirely in software, or in a combination of hardware and software. Some of the units, sub-units, and/or elements may be optional. Any software described herein may be specially purposed software for performing a particular function. In some embodiments, hardware may also be specially purposed hardware for performing some particular functions. Furthermore, each of the signal processor 202, the memory unit 204, the I/O unit 206, and/or the communication unit 208 may be operatively and/or otherwise communicatively coupled with each other using a chipset such as an intelligent chipset 209. The chipset 209 may have hardware for supporting the first connection to the input signal system, the second connection to the application signal system, and the third connection to the output signal system. While sub-units may be shown in a particular unit on FIG. 1, the sub-units may alternatively or additionally be present in a different sub-unit. For example, a sub-unit that is present in the memory unit 204 may alternatively or additionally be present in the signal processor 202. Some sub-units may be optional, while other sub-units, not presented in FIG. 2, may also be included in any of the units described herein.

The signal processor 202 may control any of the other units, sub-units of the units, and/or functions performed by the units. Any actions described herein as being performed by a processor may be taken by the signal processor 202 alone and/or by the signal processor 202 in conjunction with one or more additional processors, units, sub-units, elements, components, devices, and/or the like. Additionally, while only one signal processor 202 may be shown in FIG. 2, multiple signal processors may be present and/or otherwise included in the computing environment 200. Thus, while instructions may be described as being executed by the signal processor 202 (and/or various sub-units of the signal processor 202), the instructions may be executed simultaneously, serially, and/or by one or multiple signal processors in parallel. In some embodiments, the signal processor 202 may refer to any microprocessor, such as a specially purposed microprocessor. In some embodiments, the signal processor 202 may refer to any type of signal processor, including a digital signal processor, an analog signal processor, a mixed analog-digital signal processor, and/or the like.

In some embodiments, the signal processor 202 may be implemented as one or more computer signal processor (CPU) chips and/or graphical signal processor (GPU) chips and may include a hardware device capable of executing computer instructions. The signal processor 202 may execute instructions, codes, computer programs, and/or scripts. The instructions, codes, computer programs, and/or scripts may be received from and/or stored in the memory unit 204, the I/O unit 206, the communication unit 208, sub-units of the aforementioned units, other devices and/or computing environments, and/or the like. As described herein, any unit and/or sub-unit of the computing environment 200 and/or any other computing environment may be utilized to perform any methods described herein. In some embodiments, the computing environment 200 may not include a generic computing system, but instead may include a customized computing system designed to perform the various methods described herein.

In some embodiments, the signal processor 202 may include, among other sub-units, sub-units such as a signal manager 210 (for managing, receiving, processing, analyzing, organizing, any signals), a location determinator 212 (described herein), a signal transformer 213 (for transforming inputted signals into comparable signals), a signal attribute sensor 214 (for sensing signals and signal attributes), a matching agent 216 (described herein), a fuzzy match comparator 224 (described herein), a resource allocator 230 (described herein), a signal transformer 231 (described herein), and a signal attribute comparator 233 (described herein). In some embodiments, the signal transformer 231 may also be referred to as a transducer. Any transducer described herein refers to a signal transducer (or data transducer or information transducer) that transforms signals (or data or information) from one form (e.g., input signals) to another (e.g., comparable signals). Therefore, any references to the terms agent, transducer, or transformer are equivalent. Any agent, transducer, or transformer described herein may be a hardware or a software agent, transducer, or transformer (e.g., a set of instructions). Each of the aforementioned sub-units of the signal processor 202 may be communicatively and/or otherwise operably coupled with each other.

The location determinator 212 may facilitate detection, generation, modification, analysis, transmission, and/or presentation of location information. Location information may include global positioning system (GPS) coordinates, an Internet protocol (IP) address, a media access control (MAC) address, geolocation information, an address, a port number, a zip code, a server number, a proxy name and/or number, device information (e.g., a serial number), and/or the like. In some embodiments, the location determinator 212 may include various sensors, a radar, and/or other specifically-purposed hardware elements for enabling the location determinator 212 to acquire, measure, and/or otherwise transform location information of a computing device (e.g., the input signal system, the cascading linkage machine, the signal database, the visualization portal, and/or the like) in which the location determinator 212 is located or a computing device different from that in which the location determinator 212 is located.

Although a single matching agent 216 is shown in FIG. 2, multiple matching agents may be provided. In some embodiments, the matching agent 216 may analyze an input signal. In some embodiments, the matching agent 216 may deserialize (extracting a data structure from a series of bytes) the payload of a signal to access the information in the signal. The matching agent 216 may determine, based on attributes of the signal, whether there is a match between two different types of signals (e.g., input signals, comparable signals, stored signals, and/or the like) or two of the same type of signals (e.g., input signals, comparable signals, stored signals, and/or the like).

In some embodiments, the fuzzy match comparator 224 may fuzzy match compare an input signal to one or more stored signals. The fuzzy match comparator 224 may also compare one input signal to another input signal. The fuzzy match comparator 224 may use a random forest post processing technique, a logistic regression post processing technique, or any other technique. Also, the fuzzy match comparator 224 may use a combination of two or more techniques.

In some embodiments, the signal transformer 231 may transform an input signal into a comparable signal, which may be used as the signal for comparison processes, including that of the cascading linkage machine. The signal transformer 231 may need to extract certain attributes from, add information to, or modify information in the input signal in order to make it a comparable signal. In some embodiments, the signal transformer 231 may also need to transform stored signals into comparable signals. The comparable signal (transformed from the input signal by the signal transformer 231) may be needed by the matching agent 216 in order to compare it with a stored signal.

In some embodiments, the signal attribute comparator 233 may compare one attribute of a signal (e.g., input signal, comparable signal, stored signal, and/or the like) to the same attribute of one or more signals (e.g., input signals, comparable signals, stored signals, and/or the like). The signal attribute comparator 233 may compare one attribute of one signal to a different attribute of one or more signals. Also, the signal attribute comparator 233 may compare multiple attributes of two different signals simultaneously or non-simultaneously.

The resource allocator 230 may facilitate the determination, monitoring, analysis, and/or allocation of computing resources throughout the computing environment. As such, computing resources of the computing environment 200 utilized by the signal processor 202, the memory unit 204, the I/O unit 206, and/or the communication unit 208 (and/or any sub-unit of the aforementioned units) such as processing power, data storage space, network bandwidth, and/or the like may be in high demand at various times during operation. Accordingly, the resource allocator 230 may be configured to manage the allocation of various computing resources as they are required by particular units and/or sub-units of the computing environment 200 (e.g., the signal processor 202). In some embodiments, the resource allocator 230 may include sensors and/or other specially-purposed hardware for monitoring performance of each unit and/or sub-unit of the computing environment 200, as well as hardware for responding to the computing resource needs of each unit and/or sub-unit. In some embodiments, the resource allocator 230 may utilize computing resources of a second computing environment separate and distinct from the computing environment 200 to facilitate a desired operation. Therefore, in some embodiments, any signal processor may be referred to as a load-balancing signal processor. Any apparatus described herein may be referred to as load-balancing apparatus or server. The term load-balancing may refer to allocation of computing resources to the various units of the computing environment 200.

For example, the resource allocator 230 may determine a number of computing operations (e.g., signal transformation requests, cascading linkage requests, matching requests, and/or the like). The resource allocator 230 may then determine that the number of computing operations or computing resources (e.g., processing power, storage space of a particular non-transitory computer-readable memory medium, network bandwidth, and/or the like) required by the determined number of computing operations meets and/or exceeds a predetermined threshold value. Based on this determination, the resource allocator 230 may determine an amount of additional computing resources (e.g., processing power, storage space of a particular non-transitory computer-readable memory medium, network bandwidth, and/or the like) required by the signal processor 202, the memory unit 204, the I/O unit 206, the communication unit 208, and/or any sub-unit of the aforementioned units for enabling safe and efficient operation of the computing environment 200 while supporting the number of simultaneous computing operations. The resource allocator 230 may then retrieve, transmit, control, allocate, and/or otherwise distribute determined amount(s) of computing resources to each element (e.g., unit and/or sub-unit) of the computing environment 200 and/or another computing environment. In some embodiments, the allocation of computing resources of the resource allocator 230 may include the resource allocator 230 flipping a switch, adjusting processing power, adjusting memory size, partitioning a memory element, transmitting and/or receiving signals, controlling one or more input and/or output devices, modifying various communication protocols, and/or the like. In some embodiments, the resource allocator 230 may facilitate utilization of parallel processing techniques, e.g., for parallel computing operations. A computing operation may refer to any operation, function, method, process, and/or the like, described in this disclosure.

In some embodiments, the resource allocator 230 may determine an amount of processing power for performing the transforming of a signal (e.g., input signal, stored signal, and/or the like) into a comparable signal when an amount of available processing power is equal to or greater than the amount of processing power for performing the transforming of the signal.

In some embodiments, the memory unit 204 may be utilized for storing, recalling, receiving, transmitting, and/or accessing various signals, signal attributes, or other information during operation of the computing environment 200. The memory unit 204 may include various types of signal storage media such as solid state storage media, hard disk storage media, and/or the like. The memory unit 204 may include dedicated hardware elements such as hard drives and/or servers, as well as software elements such as cloud-based storage drives. For example, the memory unit 204 may include various sub-units such as an operating system unit 232, an application unit 234, an application programming interface (API) unit 236, a signal storage unit 238 (for storing signals such as input signals, comparable signals, stored signals, and/or the like), a secure enclave 240, and a cache storage unit 242.

The memory unit 204 and/or any of its sub-units described herein may include random access memory (RAM), read only memory (ROM), and/or various forms of secondary storage. RAM may be used to store volatile signals and/or to store instructions that may be executed by the signal processor 202. For example, the signals stored may be a command, a current operating state of the computing environment 200 (or of a particular unit or sub-unit of the computing environment 200), an intended operating state of the computing environment 200 (or of a particular unit or sub-unit of the computing environment 200), and/or the like. As a further example, signals stored in the memory unit 204 may include instructions related to various methods and/or functionalities described herein. ROM may be a non-volatile memory device that may have a smaller memory capacity than the memory capacity of a secondary storage. ROM may be used to store instructions and/or signals that may be read during execution of computer instructions. In some embodiments, access to both RAM and ROM may be faster than access to secondary storage. Secondary storage may be comprised of one or more disk drives and/or tape drives and may be used for non-volatile storage of signals or as an over-flow signals storage device if RAM is not large enough to hold all working data. Secondary storage may be used to store programs that may be loaded into RAM when such programs are selected for execution. In some embodiments, the memory unit 204 may include one or more databases for storing any signals described herein. Additionally or alternatively, one or more secondary databases located remotely from the computing environment 200 may be utilized and/or accessed by the memory unit 204.

The operating system unit 232 may facilitate deployment, storage, access, execution, and/or utilization of an operating system utilized by the computing environment 200 and/or any other computing environment described herein. In some embodiments, the operating system may include various hardware and/or software elements that serve as a structural framework for enabling the signal processor 202 to execute various operations described herein. The operating system unit 232 may further store various pieces of information and/or data associated with operation of the operating system and/or the computing environment 200 as a whole, such as a status of computing resources (e.g., processing power, memory availability, resource utilization, and/or the like), runtime information, modules to direct execution of operations described herein, user or computing device permissions to access and/or modify any of the systems described herein, security credentials to access and/or modify any of the systems described herein, and/or the like.

The application unit 234 may facilitate deployment, storage, access, execution, and/or utilization of an application utilized by the computing environment. For example, users may be required to download, access, and/or otherwise utilize a software application on a computing device such as a smartphone, tablet, or computing device, in order for various operations described herein to be performed. The computing device may be in communication with the input signal system, the cascading linkage machine, the signal database, the visualization portal, and/or the like. Information included in the application unit 234 may enable a user to execute various computing operations described herein. The application unit 234 may further store various pieces of information associated with operation of the application and/or the computing environment as a whole, such as a status of computing resources (e.g., processing power, memory availability, resource utilization, and/or the like), runtime information, modules to direct execution of operations described herein, user permissions, security credentials, and/or the like.

The API unit may facilitate deployment, storage, access, execution, and/or utilization of information associated with APIs of the computing environment 200. For example, the computing environment 200 may include one or more APIs for enabling the systems illustrated in FIG. 1 (e.g., the input signal system, the cascading linkage machine, the signal database, the visualization portal, and/or the like) to communicate with each other and/or perform computing operations described herein. Accordingly, the API unit may include API databases comprising information that may be accessed and/or utilized by applications and/or operating systems of other devices and/or computing environments. In some embodiments, each API database may be associated with a customized physical circuit included in the memory unit 204 and/or the API unit 236. Additionally, each API database may be public and/or private, and so authentication credentials may be required to access information in an API database. The signal storage unit 238 may facilitate deployment, storage, access, and/or utilization of signals (e.g., input signals, comparable signals, stored signals, and/or the like) by any system, unit, sub-unit, and/or the like, in the computing environment.

In some embodiments, the API unit 236 may comprise a matching agent API 294, a signal transformer API 295, a signal attribute comparator API 296, and a fuzzy match comparator API 297. Each of the various APIs may be executed by the signal processor 202 or one or more sub-units of the signal processor 202. The matching agent API 294 may enable matching signals (e.g., input signals, comparable signals, stored signals, and/or the like) to other signals (e.g., input signals, comparable signals, stored signals, and/or the like). The signal transformer API 295 may enable transforming input signals or stored signals into comparable signals. The signal attribute comparator API 296 may enable access of attributes of signals from signal systems which are compared and used in methods described herein (e.g., random forest technique, logistic regression technique, fuzzy matching comparison technique, and/or the like). The fuzzy match comparator API 297 may enable fuzzy matching comparison of signals.

The secure enclave 240 may facilitate secure storage of signals (e.g., transformation signals, comparable signals, input signals, and/or the like) or signal attributes. In some embodiments, the secure enclave 240 may include a partitioned portion of storage media included in the memory unit 204 that is protected by various security measures. For example, the secure enclave 240 may be hardware secured. In other embodiments, the secure enclave 240 may include one or more firewalls, encryption mechanisms, and/or other security-based protocols. Authentication credentials of a user may be required prior to providing the user access to signals stored within the secure enclave 240.

The cache storage unit 242 may facilitate short-term deployment, storage, access, analysis, and/or utilization of signals (e.g., input signals, comparable signals, stored signals, and/or the like). For example, the cache storage unit 242 may serve as a short-term storage location for signals so that the signals may be accessed quickly. In some embodiments, the cache storage unit 242 may include RAM and/or other storage media types that enable quick recall of stored signals. The cache storage unit 242 may included a partitioned portion for storing specific signals (e.g., input signals, comparable signals, stored signals, and/or the like).

Any aspect of the memory unit 204 may comprise any collection and arrangement of volatile and/or non-volatile components suitable for storing signals. For example, the memory unit 204 may comprise random access memory (RAM) devices, read only memory (ROM) devices, magnetic storage devices, optical storage devices, and/or any other suitable data storage devices. In particular embodiments, the memory unit 204 may represent, in part, computer-readable storage media on which computer instructions and/or logic are encoded. The memory unit 204 may represent any number of memory components within, local to, and/or accessible by a processor.

The I/O unit 206 may include hardware and/or software elements for enabling the computing environment to receive, transmit, or present signals, signal attributes, and/or the like. In this manner, the I/O unit 206 may enable the computing environment to interface with a human user. As described herein, the I/O unit 206 may include sub-units such as an I/O device 244 and an I/O calibration unit 246.

The I/O device 244 may facilitate the receipt, transmission, processing, presentation, display, input, and/or output of signals as a result of executed processes described herein. In some embodiments, the I/O device 244 may include a plurality of I/O devices. In some embodiments, the I/O device 244 may include one or more elements of a signal system, a computing device, a server, and/or a similar device.

The I/O device 244 may include a variety of elements that enable a user to interface with the computing environment. For example, the I/O device 244 may include a keyboard, a touchscreen, a touchscreen sensor array, a mouse, a stylus, a button, a sensor, a depth sensor, a tactile input element, a location sensor, a biometric scanner, a laser, a microphone, a camera, and/or another element for receiving and/or collecting input from a user and/or information associated with the user and/or the user's environment. Additionally and/or alternatively, the I/O device 244 may include a display, a screen, a projector, a sensor, a vibration mechanism, a light emitting diode (LED), a speaker, a radio frequency identification (RFID) scanner, and/or another element for presenting and/or otherwise outputting signals and/or signal attributes to a user. In some embodiments, the I/O device 244 may communicate with one or more elements of the signal processor 202 and/or the memory unit 204 to execute operations described herein.

The I/O calibration unit 246 may facilitate the calibration of the I/O device 244. For example, the I/O calibration unit 246 may detect and/or determine one or more settings of the I/O device 244, and then adjust and/or modify settings so that the I/O device 244 may operate more efficiently. In some embodiments, the I/O calibration unit 246 may utilize a calibration driver (or multiple calibration drivers) to calibrate the I/O device 244.

The communication unit 208 may facilitate establishment, maintenance, monitoring, and/or termination of communications between the computing environment 200 and other systems, units, sub-units, and/or the like, illustrated in FIGS. 1 and 2. The communication unit 208 may further enable communication between various elements (e.g., units and/or sub-units) of the computing environment 200. In some embodiments, the communication unit 208 may include a network protocol unit 250, an API gateway 252, an encryption engine 254, a communication device 256, an input communication interface 258 (e.g., for establishing a connection to a signal database and retrieving a signal from the database), a transformation communication interface 262 (e.g., transforming an input and/or stored signal into a comparable signal), and an output communication interface 264 (e.g., for establishing a third connection to an output signal system and transmitting an output signal such as the results to a comparison). In some embodiments, one or more of the communication interfaces may be combined into a single interface. The communication unit 208 may include hardware and/or software elements.

The network protocol unit 250 may facilitate establishment, maintenance, and/or termination of a communication connection between the computing environment 200 and another device by way of a network. For example, the network protocol unit 250 may detect and/or define a communication protocol required by a particular network and/or network type. Communication protocols utilized by the network protocol unit 250 may include Wi-Fi protocols, Li-Fi protocols, cellular data network protocols, Bluetooth® protocols, WiMAX protocols, Ethernet protocols, powerline communication (PLC) protocols, Voice over Internet Protocol (VoIP), and/or the like. In some embodiments, facilitation of communication between the computing environment 200 and any other device, as well as any element internal to the computing environment 200, may include transforming and/or translating signals from being compatible with a first communication protocol to being compatible with a second communication protocol. In some embodiments, the network protocol unit 250 may determine and/or monitor an amount of signal traffic to consequently determine which particular network protocol is to be used for transmitting and/or receiving signals.

The API gateway 252 may facilitate the enablement of other devices and/or computing environments to access the API unit 236 of the memory unit 204 of the computing environment 200. For example, a computing device may access the API unit 236 via the API gateway 252. In some embodiments, the API gateway 252 may be required to validate user credentials associated with a user of a computing device prior to providing access of the API unit 236 to the user. The API gateway 252 may include instructions for enabling the computing environment 200 to communicate with another device.

The encryption engine 254 may facilitate translation, encryption, encoding, decryption, and/or decoding of signals received, transmitted, and/or stored by the computing environment 200. Using the encryption engine 254, each transmission of signals may be encrypted, encoded, and/or translated for security reasons, and any received signals may be encrypted, encoded, and/or translated prior to its processing and/or storage. In some embodiments, the encryption engine 254 may generate an encryption key, an encoding key, a translation key, and/or the like, which may be transmitted along with any signals. The key may need to be known by the recipient in order to read the signals.

The communication device 256 may include a variety of hardware and/or software specifically purposed to enable communication between the computing environment 200 and another device, as well as communication between elements of the computing environment 200. In some embodiments, the communication device 256 may include one or more radio transceivers, chips, analog front end (AFE) units, antennas, signal processors, memory, other logic, and/or other components to implement communication protocols (wired or wireless) and related functionality for facilitating communication between the computing environment 200 and any other device. Additionally and/or alternatively, the communication device 256 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

It is contemplated that the computing elements provided according to the structures disclosed herein be included in integrated circuits or chipsets of any type to which their use commends them, such as ROMs, RAM (random access memory), DRAM (dynamic RAM), and video RAM (VRAM), PROMs (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays and specialized processors such as signal processors (DSP), graphics system processors (GSP), synchronous vector processors (SVP), and image system processors (ISP) all represent sites of application of the principles and structures disclosed herein.

Implementation of any unit or sub-unit of any device described herein is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

The computing environment 200 may include, but is not limited to, computing grid systems, distributed computing environments, cloud computing environment, and/or the like. Such networked computing environments include hardware and software infrastructures configured to form a virtual organization comprised of multiple resources which may be in geographically disperse locations. For example, the input signal system, the cascading linkage machine, the signal database, and/or the visualization portal may be in different geographical locations.

Figure 3:
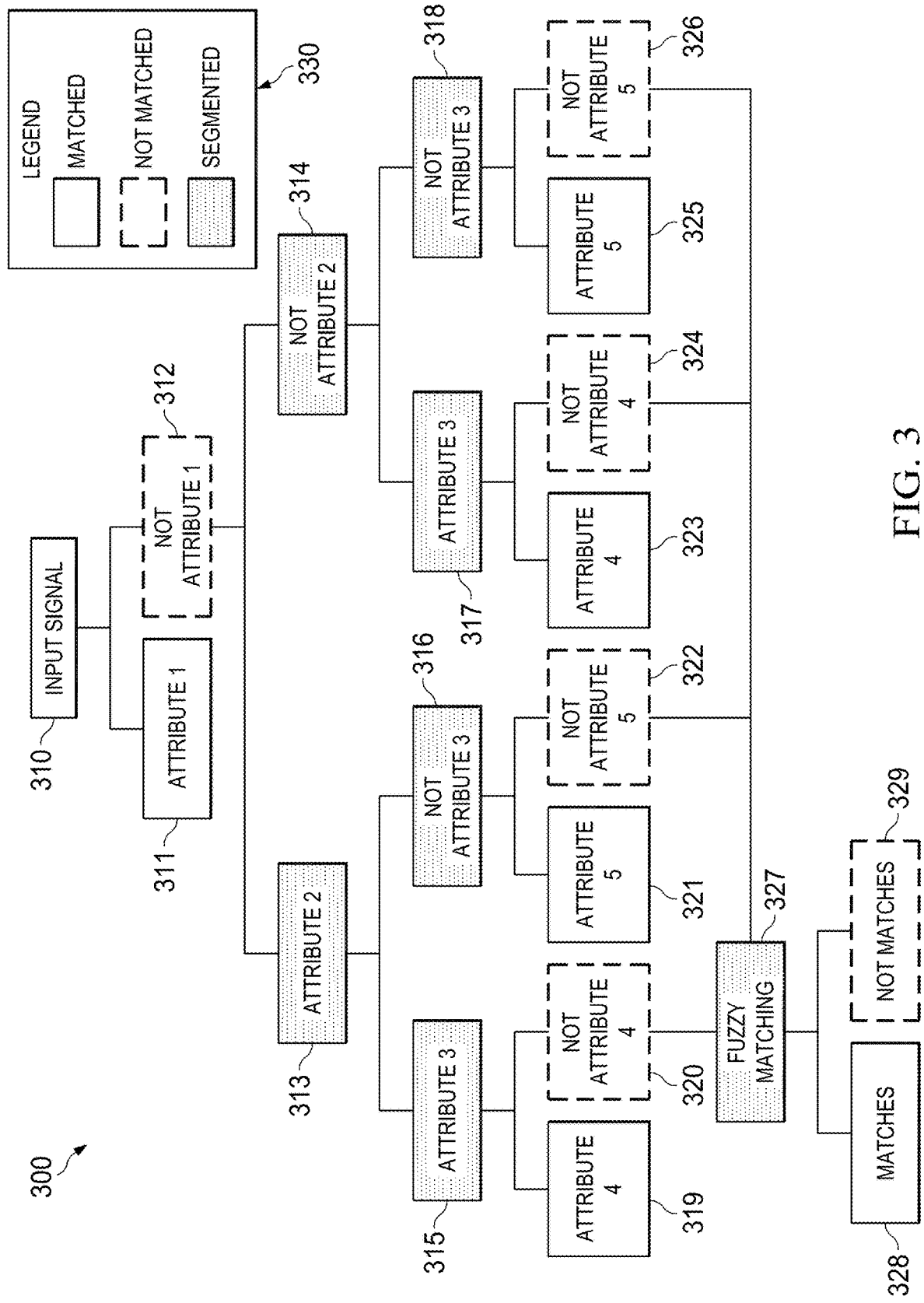
FIG. 3 is a block diagram of a cascading linkage machine, in accordance with some embodiments of the invention.

FIG. 3. illustrates a cascading linkage machine 300 (the machine) used to compare the attributes of an input signal to the same attributes of one or more stored signals in a signal database and determine if there are matches between the input signal and a stored signal by cascading through matching operations. The machine 300 uses a supervised machine learning approach to recognize and learn patterns in signals (e.g., input signals, comparable signals, stored singles, and/or the like) using artificial intelligence. The machine 300 is calibrated periodically, based on the past linkage of signals (e.g., input signals, comparable signals, stored singles, and/or the like).

The machine 300 starts by performing a first comparison operation. The first comparison operation determines whether a first attribute of the input signal is the same as 311 or not the same as 312 that of one or more stored signals. To do so, the machine 300 connects to a signal database, using a wired or wireless connection, and accesses signals stored in the signal database. The one or more signals that the machine 300 retrieves from this signal database are the one or more signals used to compare attributes with the input signal.

If the first comparison operation determines the attribute of any of the stored signals to be the same as that of the input signal 311, the machine 300 creates a link between those two signals indicating they are a match and does not cascade to any further matching operations. This could involve either or both signals being tagged with an association to the other signal. Alternatively, the input signal, the comparable signal, and/or the one or more stored signals could be stored in a second database of stored signals. If the first comparison operation determines the first attribute of the input signal is not the same as that of any of the one or more stored signals 312, the machine 300 cascades to a second comparison operation.

The second comparison operation determines whether a second attribute of the input signal is the same as 314 or not the same as 313 that of one or more stored signals. In some embodiments, the second attribute is completely different from the first attribute. In other embodiments, the second attribute is the same as or related to the first attribute. After the second comparison operation, regardless of whether the attributes matched, the machine 300 cascades to a third comparison operation, which determines if a third attribute of the input signal is the same as (315, 317) or not the same as (316, 318) that of one or more stored signals. If the third comparison operation determines the attribute of any of the stored signals to be the same as that of the input signal, the machine 300 cascades to a fourth comparison operation. The fourth comparison operation determines if a fourth attribute of the stored signal is the same as (319, 323) or not the same as (320, 324) that of one or more stored signals. If the fourth comparison operation determines the attribute of any of the stored signals to be the same as that of the input signal (319, 323), the machine 300 creates a link between those two signals, indicating they are a match and does not cascade to any further matching operations. If the third comparison operation determines the attribute of any of the stored signals to not be the same as that of the input signal (316, 318), the machine 300 cascades to a fifth comparison operation. The fifth comparison operation determines whether a fifth attribute of the input signal is the same as (321, 325) or not the same as (322, 326) that of one or more stored signals. If the fifth comparison operation determines the attribute of any of the stored signals to be the same as that of the input signal (321, 325), the machine 300 creates a link between those two signals indicating they are a match.

Figure 5:
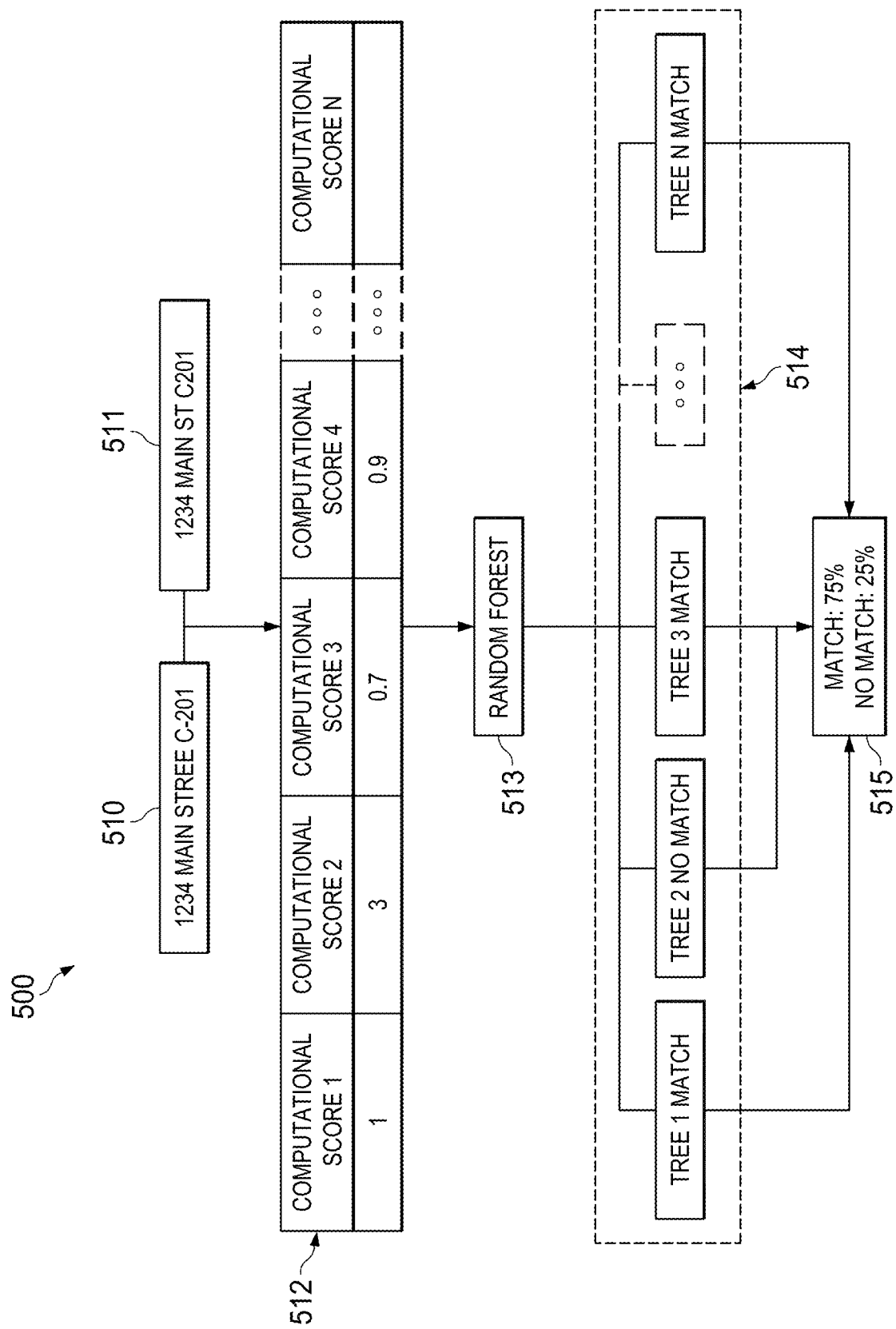
FIG. 5 is a block diagram of a random forest post processing technique for intelligent machine cascading linkage, in accordance with some embodiments of the invention.
Figure 6:
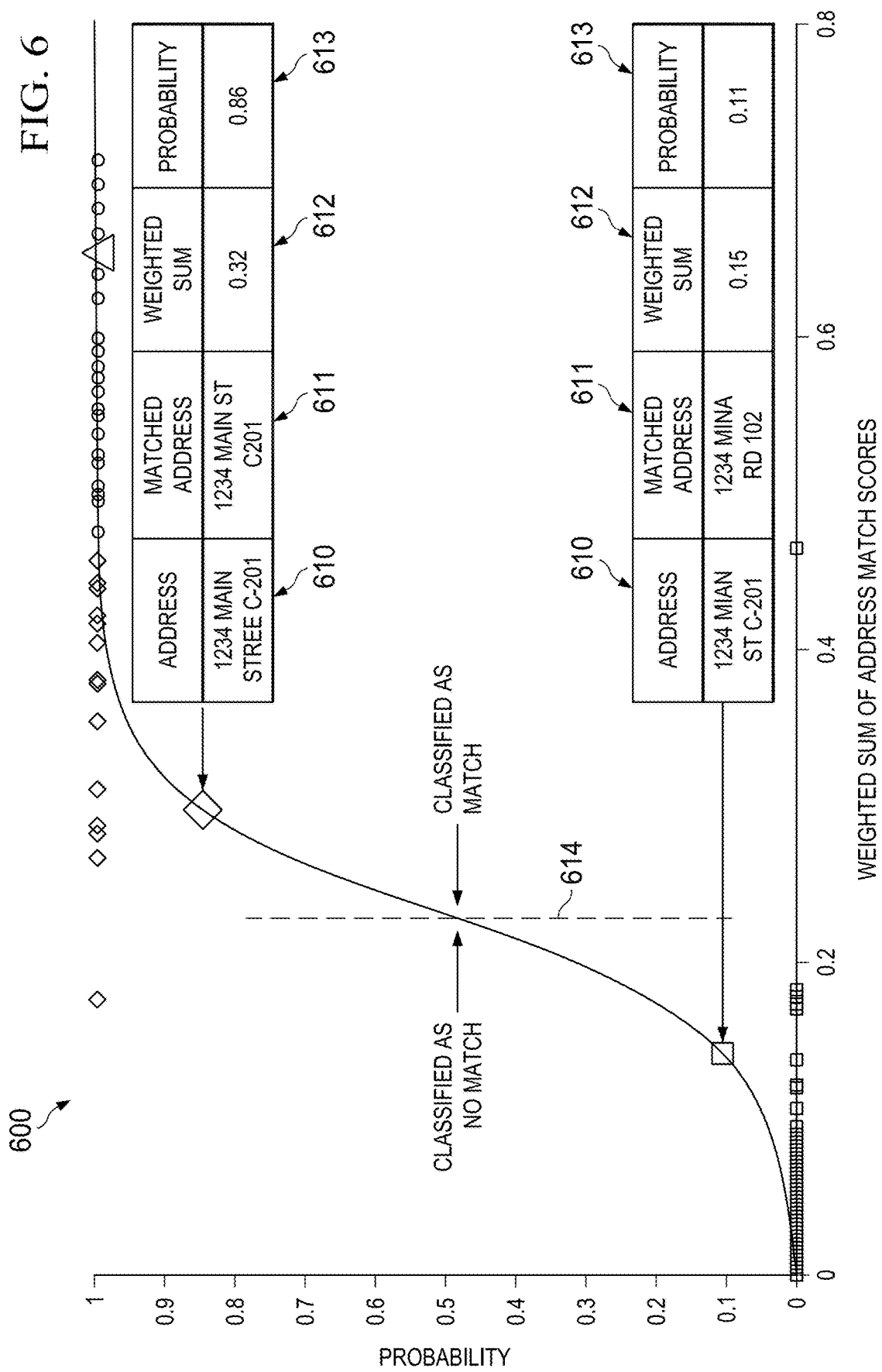
FIG. 6 is a chart of a logistic regression post processing technique for intelligent machine cascading linkage, in accordance with some embodiments of the invention.

After the fourth and fifth comparison operations, regardless of whether the attributes matched, a fuzzy matching comparison 327 is performed. In one embodiment, the fuzzy matching comparison 327 uses either a random forest post processing technique (such as illustrated in FIG. 5) or a logistic regression post processing technique (such as illustrated in FIG. 6) to compare the input signal to one or more stored signals and determine whether the two signals are a match 328 or not a match 329. In this specific embodiment, the fuzzy matching comparison technique 327 uses both techniques in combination. In other embodiments, any other techniques may be used. In other embodiments, a combination of any one or more different techniques may be used. FIG. 3 shows only 320, 322, 324, and 326 connected to the fuzzy matching comparison 327; however, in different embodiments any combination of 319-326 could be connected to, and thus enter, the fuzzy matching comparison 327. For example, all of 319-326 and/or only those which are matches (319, 321, 323, 325) could enter the fuzzy matching comparison 327.

Those boxes labeled "Matched" in the "Legend" 330 represent a matching operation finding a match, so no other matching operations take place after the "Matched" 330 boxes. Those boxes labeled "Not Matched" in the "Legend" 330 represent a matching operation not finding a match, so another matching operation might take place after the "Not Matched" 330 boxes. Those boxes labeled "Segmented" in the "Legend" 330 represent a matching operation either finding or not finding a match, but the "Segmented" 330 boxes are followed by a matching operation either way. In some embodiments, different "Legend" 330 box types could have different representations than the before mentioned embodiment. In other embodiments, each box of FIG. 3 could be any of the three options listed in the "Legend" ("Matched," "Not Matched," "Segmented") 330 or any other like option.

FIG. 4 illustrates a link table 400, depicting seven examples of inputs 410 and outputs 413. As illustrated by the cascading linkage machine 300 of FIG. 3, the input signals 410 are compared with one or more respective signals stored in a signal database 411. The "Matching Score" 412 should be above a certain threshold in order for the output to be a "Good Match" 413. This threshold could be any amount the user sees fit, which the user may input via the input signal system (such as the input signal system 101 illustrated in FIG. 1). Those signals which are determined to be matches by the methods of the link table 400 are linked by the cascading linking machine, seen as the "Matched" boxes in FIG. 3 (refer to the "Legend" 330). With respect to any figure description herein, any reference to the term signal could be referring to an input signal, a comparable signal, a stored signal, and/or the like. In some embodiments, the link table 400 "Comment[s]" 413 are the input to the fuzzy matching comparison. In some embodiments, the "Comment[s]" 413 are the outputs of any cascading matching operation of the cascading linkage machine illustrated in FIG. 3. In still other embodiments, the "Comment[s]" 413 are both of the before mentioned embodiments and/or neither. In some embodiments, the "Comment[s]" 413 are the output to other matching operations and/or techniques.

Four different types of "Comment[s]" 413 are illustrated in FIG. 4, including "Good match," "False positive," "Multiple Match," and "No Match." A "good match" 413 is before mentioned and herein mentioned as a match. A "False positive" is not a match. A "Multiple Match" may be a match or not a match, in different situations, as it means that two possible matches were found. A "No Match" is before mentioned and herein mentioned as not a match.

FIG. 5 illustrates the random forest post processing technique 500, which can be used to perform the fuzzy matching comparison 327. The random forest technique 500 takes the signal 510 and one of the one or more signals 511 as input. It performs "N" number of calculations using the two inputs (510, 511), providing "N" number of "Score[s]" 512. This list of input scores 512 could be calculated using any combination of formulas, analytical tools, and/or other computations. The random forest technique 500 includes one or more "Tree[s]" 514. In one embodiment, the "Tree[s]" 514 compare the input scores to threshold scores. In another embodiment, the "Tree[s]" 514 compare certain input scores with other certain input scores. In this specific embodiment, the "Tree[s]" 514 transform the input scores 512 into an indication of whether the signals match for each attribute, which is necessary to create a final computational score 515. The random forest technique 500 can have "N" number of "Tree[s]" 514, which output an indication of whether the signals match for each attribute, after completing their prescribed methods. The outputs of each "Tree" 514 are compiled into one final computational score 515, which is the percentage of "Tree[s]" 514 that indicated that the two input scores match (510, 511) and the percentage of "Tree[s]" 514 that indicated that the two inputs do not match (510, 511). Based on the final computational score 515 and a specified threshold percentage for a match, the random forest technique 500 will either output that the two signals are or are not a match. This specified threshold can be any value the user sees fit, which the user may input via the input signal system (such as the input signal system 101 illustrated in FIG. 1).

FIG. 6 illustrates the logistic regression post processing technique 600, which can be used during the fuzzy matching comparison technique 327. The logistic regression technique 600 takes the input signal 610 and one of the one or more stored signals 611 and calculates a weighted sum 612 and probability 613 that the two are a match. In one embodiment, the weighted sum and probability are calculated using only the input signal and one of the one or more stored signals. In other embodiments, they are calculated using a database of stored signals in conjunction with the previously stated embodiment and/or by itself. The logistic regression technique 600 uses the weighted sum 612 and the probability 613 that the input signal and the stored signal are a match to calculate the statistical odds that the two signals are indeed a match. Based on how the weighted sum 612 and probability 613 compare to the threshold 614, the logistic regression technique 600 determines the chances that the input signal and the stored signal are a match. This threshold 614 represents the smallest calculated statistical odds that the two signals are indeed a match acceptable for the fuzzy matching comparison technique to indeed consider the two signals a match. There is an exemplary threshold 614 in FIG. 6; however, the threshold 614 can be any value the user sees fit, which the user may input via the input signal system (such as the input signal system 101 illustrated in FIG. 1). The greater the threshold, the greater the odds that the matches made by the fuzzy matching comparison technique are correct.

Figure 7B:
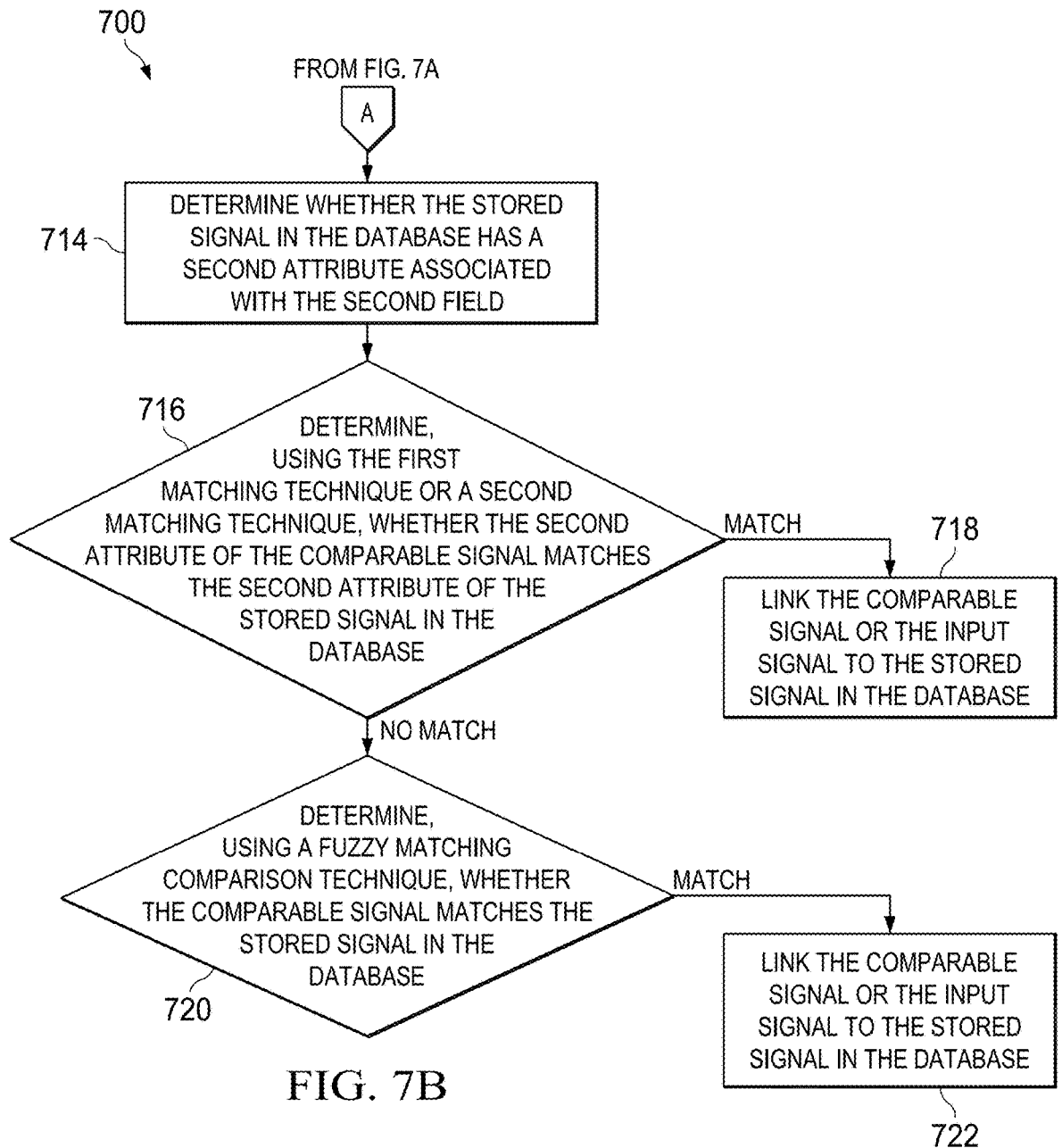

FIGS. 7A and 7B are block diagrams of a method for an intelligent cascading linkage machine in a complex computing network. The various blocks of FIGS. 7A and 7B may be executed in a different order from that shown in FIGS. 7A and 7B. Some blocks may be optional. In some embodiments, each of the various blocks of 7A and 7B may be performed by different systems presented in FIG. 1 or any of the units, sub-units, and/or elements presented in FIG. 2, or any combination thereof. For example, the method described herein may be performed by the signal processor 202 of FIG. 2. In some embodiments, the various blocks of 7A and 7B may be performed wholly by any one of the systems presented in FIG. 1 or any one of the units, sub-units, and/or elements presented in FIG. 2.

At block 702, the method comprises establishing a first connection to an input signal system, and receiving, on the first connection, an input signal comprising a first attribute and a second attribute, the first attribute being associated with a first field and the second attribute being associated with a second field.

At block 704, the method comprises establishing a second connection to a database comprising stored signals, and accessing the sored signals on the second connection. At block 706, the method comprises transforming the input signal into a comparable signal. At block 708, the method comprises determining whether a stored signal in the database has a first attribute associated with the first field.

At block 710, the method comprises determining, using a first matching technique, whether the first attribute of the comparable signal matches the first attribute of the stored signal in the database. In some embodiments, the processor of the cascading linkage machine is further configured for determining a strength indicator indicating a strength of the linking of the comparable signal or the input signal to the stored signal in the database.

At block 712, the method comprises linking the comparable signal or the input signal to the stored signal in the database. In some embodiments, the method further comprises the intelligent cascading linkage machine providing a field or a matching technique that causes the linking of the comparable signal or the input signal to the stored signal in the database.

At block 714, the method comprises determining whether the stored signal in the database has a second attribute associated with the second field. At block 716, determining, using the first matching technique or a second matching technique, whether the second attribute of the comparable signal matches the second attribute of the stored signal in the database. At block 718, the method comprises linking the comparable signal or the input signal to the stored signal in the database.

At block 720, the method comprises determining, using a fuzzy matching comparison technique, whether the comparable signal matches the stored signal in the database. In some embodiments, the fuzzy matching comparison technique of the cascading linkage machine further comprises a random forest processing technique. In some embodiments, the fuzzy matching comparison technique of the cascading linkage machine further comprises a logistic regression technique.

At block 722, the method comprises linking the comparable signal or the input signal to the stored signal in the database In some embodiments, the processor of the intelligent cascading linkage machine is further configured for providing a link table comprising the comparable signal or the input signal, the stored signal in the database linked to the comparable signal or the input signal, and a strength indicator indicating a strength of the linking of the comparable signal or the input signal to the stored signal in the database.

In some embodiments, the link table further comprises a second stored signal in the database linked to the comparable signal or the input signal. In some embodiments, the link table further comprises comparable second signal or input second signal not linked to a stored signal in the database.

In some embodiments, the processor of the intelligent cascading linkage machine is further configured for calibrating, based on the linking of the comparable signal or the input signal to the stored signal in the database, the first matching technique, the second matching technique, the fuzzy matching comparison technique, or a technique for calculating a strength indicator indicating a strength of the linking of the comparable signal or the input signal to the stored signal in the database. In some embodiments, the method further comprises the intelligent cascading linkage machine configured for calibrating, based on the linking of the comparable signal or the input signal to the stored signal in the database, a technique for calculating the strength indicator.

In some embodiments, the processor of the intelligent cascading linkage machine is further configured for determining, using an eliminatory matching technique, a second stored signal in the database incorrectly linked to the comparable signal or the input signal; and eliminating the linking between the second stored signal in the database and the comparable signal or the input signal.

In some embodiments, the first attribute 311, second attribute 313, third attribute (315, 317), fourth attribute (319, 323), and fifth attribute (321, 325) referred to in FIG. 3 may represent APN (assessors parcel number assigned by taxing jurisdictions) and Geo5 (number code comprised of state and country federal information processing standards code) values; condo; zip code; address and zip code; and address and city respectively. The before mentioned input signal may be a loan, property, or mortgage document and the before mentioned one or more stored signals may be property data sources (e.g., industry loans, loan servicing borrower information, valuations, listing information, property documents, and/or the like) stored in a signal database 104. In some embodiments, the before mentioned documents may be a physical and/or electronic file.

In another embodiment, the first attribute 311, second attribute 313, third attribute (315, 317), fourth attribute (319, 323), and fifth attribute (321, 325) referred to in FIG. 3 may be different from but related to property details, such as real estate broker information, number of people who visit a property, weather of particular properties (e.g., in different cities, states, countries, and/or the like), and/or the like.

In still another embodiment, the first attribute 311, second attribute 313, third attribute (315, 317), fourth attribute (319, 323), and fifth attribute (321, 325) referred to in FIG. 3 may be completely separate from property and loan files. For example, cascading linkage machine may be comparing attributes of parts of mechanical devices, electronic screen quality and/or resolution, computing latency of machinery, and/or the like.

Also, in another embodiment, the first attribute 311, second attribute 313, third attribute (315, 317), fourth attribute (319, 323), and fifth attribute (321, 325) referred to in FIG. 3 may be a combination of attributes from different fields (e.g., the before mentioned examples).

In some embodiments, at least one of the connections to the input signal system, the output signal system, the application signal system (e.g., the cascading linkage machine, the signal database, the visualization portal, the input signal system, and/or the like) may be comprised in a single connection. Any transmission, reception, connection, or communication may occur using any short-range (e.g., Bluetooth, Bluetooth Low Energy, near field communication, Wi-Fi Direct, and/or the like) or long-range communication mechanism (e.g., Wi-Fi, cellular, and/or the like). Additionally or alternatively, any transmission, reception, connection, or communication may occur using wired technologies. Any transmission, reception, or communication may occur directly between any systems, devices, units, sub-units, elements, and/or the like, described herein, or may occur directly or indirectly via a network, a signal database, a service bus, a chipset such as an intelligent chipset, and/or the like. The signal database (such as illustrated in FIG. 1) can store more than one billion records and/or signals at one time.

In some embodiments, an intelligent toolkit may be provided. The toolkit may be customizable toolkit for performing the various methods described herein. The toolkit may be installed onto a computing device that enables interaction with, manipulation of, or customization of any of the systems, units, or sub-units presented herein. Once installed, a user may be able to modify, customize, or perform any of the methods described herein. Additionally, a user may be able to customize, modify, or configure any of the systems, units, sub-units, and/or the like, presented in FIGS. 1 and 2. The intelligent toolkit may comprise a non-transitory computer readable medium comprising code configured to cause a computer to perform the various methods of the toolkit and/or any methods described herein.

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments. Reference numerals are provided in the specification for the first instance of an element that is numbered in the figures. In some embodiments, the reference numerals for the first instance of the element are also applicable to subsequent instances of the element in the specification even though reference numerals may not be provided for the subsequent instances of the element.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

The invention claimed is:

1. An intelligent cascading linkage machine for transforming input signals into comparable signals, and linking the input signals or the comparable signals to stored signals comprised in a database, wherein but for the transforming and the linking performed by a communication server, at least some of the input signals are not comparable and linkable to the stored signals comprised in the database, the intelligent cascading linkage machine comprising:

a communication interface for:
 establishing a first connection to an input signal system, and receiving, on the first connection, an input signal comprising a first attribute and a second attribute, the first attribute being associated with a first field and the second attribute being associated with a second field, and
 establishing a second connection to the database comprising stored signals, and accessing the stored signals on the second connection;

a chipset interfaced with a processor, the chipset having hardware for supporting the first connection to the input signal system and the second connection to the database;

a power provisioning interface for facilitating powering of the chipset and the processor;

and the processor configured for:
 transforming the input signal into a comparable signal, wherein the transforming comprises at least one of modifying the first attribute or the second attribute, deleting at least a portion of the first attribute or the second attribute, adding a new portion to the first attribute or the second attribute, and adding a third attribute to the input signal, the third attribute being associated with a third field;
 determining whether a stored signal in the database has a first attribute associated with the first field;
 accessing a first matching operation comprising determining, using a first matching technique, whether the first attribute of the comparable signal matches the first attribute of the stored signal in the database;
 in response to determining, using the first matching technique, the first attribute of the comparable signal does not match the first attribute of the stored signal in the database, cascading to a second matching operation comprising determining whether the stored signal in the database has a second attribute associated with the second field;

determining, using the first matching technique or a second matching technique, whether a second attribute of the comparable signal matches the second attribute of the stored signal in the database;

in response to determining, using the first matching technique or the second matching technique, the second attribute of the comparable signal does not match the second attribute of the stored signal in the database, cascading to a fuzzy match operation comprising determining, using a fuzzy matching comparison technique, whether the comparable signal matches the stored signal in the database;

in response to determining, using the fuzzy matching comparison technique, the comparable signal matches the stored signal in the database, linking the comparable signal or the input signal to the stored signal in the database, wherein the first attribute of the comparable signal does not match, using the first matching technique, the first attribute of the stored signal in the database, and wherein the second attribute of the comparable signal does not match, using the first matching technique or the second matching technique, the second attribute of the stored signal in the database;

determining a strength indicator indicating a strength of the linking of the comparable signal or the input signal to the stored signal in the database; calibrating, based on the linking of the comparable signal or the input signal to the stored signal in the database, a technique for calculating the strength indicator, wherein the calibrating the technique for calculating the strength indicator comprises improving the technique for calculating the strength indicator after the linking of the comparable signal or the input signal to the stored signal in the database;

determining a second stored signal in the database incorrectly linked to the comparable signal or the input signal, wherein the second stored signal does not match the comparable signal or the input signal;

and eliminating the linking between the second stored signal in the database and the comparable signal or the input signal, wherein the first matching technique does not comprise the fuzzy matching comparison technique, and wherein the second matching technique does not comprise the fuzzy matching comparison technique.

2. The intelligent cascading linkage machine of claim 1, wherein the processor is further configured for:
calibrating, based on the linking of the comparable signal or the input signal to the stored signal in the database, the first matching technique, the second matching technique, the fuzzy matching comparison technique, or a technique for calculating the strength indicator indicating a strength of the linking of the comparable signal or the input signal to the stored signal in the database.

3. The intelligent cascading linkage machine of claim 1, wherein the processor is further configured for:
providing a link table comprising:
the comparable signal or the input signal,
the stored signal in the database linked to the comparable signal or the input signal, and
the strength indicator indicating the strength of the linking of the comparable signal or the input signal to the stored signal in the database.

4. The intelligent cascading linkage machine of claim 3, further comprising providing a field or a matching technique that causes the linking of the comparable signal or the input signal to the stored signal in the database.

5. The intelligent cascading linkage machine of claim 3, wherein the link table further comprises a second stored signal in the database linked to the comparable signal or the input signal.

6. The intelligent cascading linkage machine of claim 3, wherein the link table further comprises a second comparable signal or a second input signal not linked to the stored signal in the database.

7. The intelligent cascading linkage machine of claim 3, wherein the link table further comprises a matching score for determining whether there is or is not a match.

8. The intelligent cascading linkage machine of claim 1, wherein the fuzzy matching comparison technique further comprises a random forest processing technique.

9. The intelligent cascading linkage machine of claim 8, wherein the fuzzy matching comparison technique comprising the random forest processing technique further comprises:
calculating a list of computational scores to be used by one or more matching operations within the fuzzy matching comparison;
calculating two final computational scores, the two final computational scores indicating the number of one or more match operations that transformed an input score into an indication of whether there is a match and whether there is no match; and
comparing one or more final computational scores to one or more thresholds, the one or more thresholds being adjustable.

10. The intelligent cascading linkage machine of claim 1, wherein the fuzzy matching comparison technique further comprises a logistic regression technique.

11. The intelligent cascading linkage machine of claim 10, wherein the fuzzy matching comparison technique comprising the logistic regression technique further comprises calculating a probability and a weighted sum of match scores, the probability and the weighted sum of match scores being compared to a threshold, the threshold being adjustable.

12. The intelligent cascading linkage machine of claim 1, wherein the fuzzy match operation further comprises at least one of:
a Jaro-Winkler distance operation,
a Levenshtein distance operation,
a Soundex operation,
an Edit distance operation,
a Support Vector Machine operation, and
a Machine Learning Library operation.

13. The intelligent cascading linkage machine of claim 1, wherein the transforming of the input signal into the comparable signal includes transforming the stored signal into a second comparable signal.

14. The intelligent cascading linkage machine of claim 1, wherein the linking the comparable signal or the input signal to the stored signal in the database further comprises: establishing a connection to the database or another database, and storing a link created by the linking in the database or the other database.

15. A method comprising:
establishing, using one or more computing device processors, a first connection to an input signal system, and receiving, on the first connection, an input signal comprising a first attribute and a second attribute, the first attribute being associated with a first field and the second attribute being associated with a second field;

establishing, using the one or more computing device processors, a second connection to a database comprising stored signals, and accessing the stored signals on the second connection;

transforming, using the one or more computing device processors, the input signal into a comparable signal, wherein the transforming comprises at least one of modifying the first attribute or the second attribute, deleting at least a portion of the first attribute or the second attribute, adding a new portion to the first attribute or the second attribute, and adding a third attribute to the input signal, the third attribute being associated with a third field;

determining, using the one or more computing device processors, whether a stored signal in the database has a first attribute associated with the first field; accessing, using the one or more computing device processors, a first matching operation comprising determining, using a first matching technique, whether a first attribute of the comparable signal matches the first attribute of the stored signal in the database;

in response to determining, using the first matching technique, the first attribute of the comparable signal does not match the first attribute of the stored signal in the database, cascading, using the one or more computing device processors, to a second matching operation comprising determining whether the stored signal in the database has a second attribute associated with the second field;

determining, using the one or more computing device processors, using the first matching technique or a second matching technique, whether a second attribute of the comparable signal matches the second attribute of the stored signal in the database;

in response to determining, using the first matching technique or the second matching technique, the second attribute of the comparable signal does not match the second attribute of the stored signal in the database, cascading, using the one or more computing device processors, to a fuzzy match operation comprising determining, using a fuzzy matching comparison technique, whether the comparable signal matches the stored signal in the database;

in response to determining, using the fuzzy matching comparison technique, the comparable signal matches the stored signal in the database, linking, using the one or more computing device processors, the comparable signal or the input signal to the stored signal in the database, wherein the first attribute of the comparable signal does not match, using the first matching technique, the first attribute of the stored signal in the database, and wherein the second attribute of the comparable signal does not match, using the first matching technique or the second matching technique, the second attribute of the stored signal in the database;

determining, using the one or more computing device processors, a strength indicator indicating a strength of the linking of the comparable signal or the input signal to the stored signal in the database;

and calibrating, using the one or more computing device processors, based on the linking of the comparable signal or the input signal to the stored signal in the database, a technique for calculating the strength indicator, wherein the calibrating the technique for calculating the strength indicator comprises improving the technique for calculating the strength indicator after the linking of the comparable signal or the input signal to the stored signal in the database, wherein the first matching technique does not comprise the fuzzy matching comparison technique, and wherein the second matching technique does not comprise the fuzzy matching comparison technique.

16. The method of claim 15, wherein the fuzzy matching comparison technique further comprises a random forest processing technique and a logistic regression technique.

17. A non-transitory computer-readable medium comprising code for causing one or more processors to perform operations of:

establishing a first connection to an input signal system, and receiving, on the first connection, an input signal comprising a first attribute and a second attribute, the first attribute being associated with a first field and the second attribute being associated with a second field;

establishing a second connection to a database comprising stored signals, and accessing the stored signals on the second connection;

transforming the input signal into a comparable signal, wherein the transforming comprises at least one of modifying the first attribute or the second attribute, deleting at least a portion of the first attribute or the second attribute, adding a new portion to the first attribute or the second attribute, and adding a third attribute to the input signal, the third attribute being associated with a third field;

determining whether a stored signal in the database has a first attribute associated with the first field;

accessing a first matching operation comprising determining, using a first matching technique, whether a first attribute of the comparable signal matches the first attribute of the stored signal in the database;

in response to determining, using the first matching technique, the first attribute of the comparable signal does not match the first attribute of the stored signal in the database, cascading to a second matching operation comprising determining whether the stored signal in the database has a second attribute associated with the second field;

determining, using the first matching technique or a second matching technique, whether a second attribute of the comparable signal matches the second attribute of the stored signal in the database;

in response to determining, using the first matching technique or the second matching technique, the second attribute of the comparable signal does not match the second attribute of the stored signal in the database, cascading to a fuzzy match operation comprising determining, using a fuzzy matching comparison technique, whether the comparable signal matches the stored signal in the database;

and in response to determining, using the fuzzy matching comparison technique, the comparable signal matches the stored signal in the database, linking the comparable signal or the input signal to the stored signal in the database, wherein the first attribute of the comparable signal does not match, using the first matching technique, the first attribute of the stored signal in the database, and wherein the second attribute of the comparable signal does not match, using the first matching technique or the second matching technique, the second attribute of the stored signal in the database, wherein the first matching technique does not comprise the fuzzy matching comparison technique, and wherein the second matching technique does not comprise the fuzzy matching comparison technique.

18. The non-transitory computer-readable medium of claim 17, wherein the code further causes the one or more processors to perform operations of:
- determining a strength indicator indicating a strength of the linking of the comparable signal or the input signal to the stored signal in the database;
- calibrating, based on the linking of the comparable signal or the input signal to the stored signal in the database, a technique for calculating the strength indicator, wherein the calibrating the technique for calculating the strength indicator comprises improving the technique for calculating the strength indicator after the linking of the comparable signal or the input signal to the stored signal in the database;
- determining a second stored signal in the database incorrectly linked to the comparable signal or the input signal, wherein the second stored signal does not match the comparable signal or the input signal; and
- eliminating the linking between the second stored signal in the database and the comparable signal or the input signal.

\* \* \* \* \*